(12) United States Patent
Yamafuku et al.

(10) Patent No.: US 9,905,827 B2
(45) Date of Patent: Feb. 27, 2018

(54) ENERGY STORAGE APPARATUS

(71) Applicant: GS Yuasa International Ltd., Kyoto-shi (JP)

(72) Inventors: Taro Yamafuku, Kyoto (JP); Takeshi Sasaki, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 0 days.

(21) Appl. No.: 14/954,729

(22) Filed: Nov. 30, 2015

(65) Prior Publication Data
US 2016/0172646 A1 Jun. 16, 2016

(30) Foreign Application Priority Data
Dec. 12, 2014 (JP) ................................. 2014-252278

(51) Int. Cl.
*H01M 2/18* (2006.01)
*H01M 10/04* (2006.01)
*H01M 2/10* (2006.01)

(52) U.S. Cl.
CPC ........... *H01M 2/18* (2013.01); *H01M 2/1077* (2013.01); *H01M 10/0431* (2013.01)

(58) Field of Classification Search
CPC ...................... H01M 2/1077; H01M 10/0431
See application file for complete search history.

(56) References Cited

U.S. PATENT DOCUMENTS

| | | | |
|---|---|---|---|
| 2009/0111010 A1 | 4/2009 | Okada et al. | |
| 2010/0190050 A1 | 7/2010 | Ochi | |
| 2011/0104547 A1 | 5/2011 | Saito et al. | |
| 2013/0108908 A1 | 5/2013 | Omura et al. | |
| 2014/0308556 A1 | 10/2014 | Obata | |
| 2014/0363715 A1* | 12/2014 | Toyoda | ................. C08F 210/06 429/94 |

FOREIGN PATENT DOCUMENTS

| | | |
|---|---|---|
| JP | 2006-048996 A | 2/2006 |
| JP | 2009-081056 A | 4/2009 |
| JP | 2009-110833 A | 5/2009 |
| JP | 2010-176997 A | 8/2010 |

(Continued)

*Primary Examiner* — Sarah A Slifka

(74) *Attorney, Agent, or Firm* — McGinn IP Law Group, PLLC.

(57) ABSTRACT

An energy storage apparatus includes: an energy storage device including a flat electrode assembly in which electrodes are layered and a prismatic case in which the electrode assembly is housed; and a spacer arranged adjacently to the energy storage device in a first direction, wherein the spacer is formed such that a thickness size in the first direction of a center portion of the spacer in a second direction, which is a direction orthogonal to the first direction and is a direction parallel to a surface of the spacer that faces the energy storage device, is set larger than a thickness size in the first direction of other portions of the spacer arranged adjacently to the center portion of the spacer in the second direction, and a width of the center portion of the spacer in a third direction orthogonal to the first and second directions at a contact portion of the spacer with the energy storage device is set smaller than a width of the case in the third direction.

18 Claims, 14 Drawing Sheets

(56) References Cited

FOREIGN PATENT DOCUMENTS

| | | |
|---|---|---|
| JP | 2011-034775 A | 2/2011 |
| JP | 2011-096478 A | 5/2011 |
| JP | 2012-059581 A | 3/2012 |
| JP | 2012-064357 A | 3/2012 |
| JP | 2012-113961 A | 6/2012 |
| JP | 2012-238603 A | 12/2012 |
| JP | 2012-256466 A | 12/2012 |
| JP | 2013-097888 A | 5/2013 |
| WO | WO 2013/098939 A1 | 7/2013 |

* cited by examiner

ENERGY STORAGE APPARATUS

CROSS-REFERENCE TO RELATED APPLICATIONS

This application claims the benefit of Japanese patent application No. 2014-252278, filed on Dec. 12, 2014, which is incorporated by reference.

FIELD

The present invention relates to an energy storage apparatus provided with an energy storage device.

BACKGROUND

Conventionally, there has been known an assembled battery provided with a plurality of prismatic batteries (see JP-A-2011-34775). To be more specific, the assembled battery includes a plurality of prismatic batteries arranged in a row in one direction, and spacers arranged between the prismatic batteries. The prismatic battery includes: a power generating element formed by layering a foil-like positive electrode and a foil-like negative electrode; and a prismatic case where the power generating element is housed.

In the prismatic battery of the assembled battery, when charging and discharging are repeated, expansion and shrinkage of the power generating element are repeated. Further, due to the repetition of charging and discharging, the positive electrode and the negative electrode of the power generating element deteriorate. Due to such deterioration of the positive electrode and the negative electrode, a reaction byproduct (a film, a gas or the like) is deposited on surfaces of the positive electrode and the negative electrode and hence, the power generating element expands.

Concerning the rigidity of the prismatic case, in a surface which faces a direction that the prismatic batteries are arranged (that is, a surface which opposedly faces the spacer), rigidity of a center portion of the surface is particularly small. Thus, in the prismatic battery, when the power generating element repeats expansion and shrinkage thereof due to the repetition of charging and discharging, a reaction force from the case against the expansion of the power generating element is small. Accordingly, a reaction force from the case against expansion of the power generating element becomes non-uniform between the center portion and other portions of the surface of the case and hence, in the power generating element, the positive electrode and the negative electrode which form the power generating element are partially displaced. As a result, a distance between the positive electrode and the negative electrode layered in the power generating element becomes non-uniform locally.

When a distance between the positive electrode and the negative electrode becomes non-uniform locally in the power generating element, the degree of progress of the deterioration of the positive electrode and the negative electrode when charging and discharging are repeated becomes non-uniform locally. In this case, a reaction in the power generating element at the time of charging and discharging becomes non-uniform thus lowering a capacity and an output of the power generating element.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus in which electrodes forming an electrode assembly are minimally displaced from each other when charging and discharging are repeated in the electrode assembly.

According to an aspect of the present invention, there is provided an energy storage apparatus which includes: an energy storage device including a flat electrode assembly in which electrodes are layered and a prismatic case in which the electrode assembly is housed; and a spacer arranged adjacently to the energy storage device in a first direction, wherein the spacer is formed such that a thickness size in the first direction of a center portion of the spacer in a second direction, which is a direction orthogonal to the first direction and is a direction parallel to a surface of the spacer that faces the energy storage device, is set larger than a thickness size in the first direction of other portions of the spacer arranged adjacently to the center portion of the spacer in the second direction, and a width of the center portion of the spacer in a third direction orthogonal to the first and second directions at a contact portion of the spacer with the energy storage device is set smaller than a width of the case in the third direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
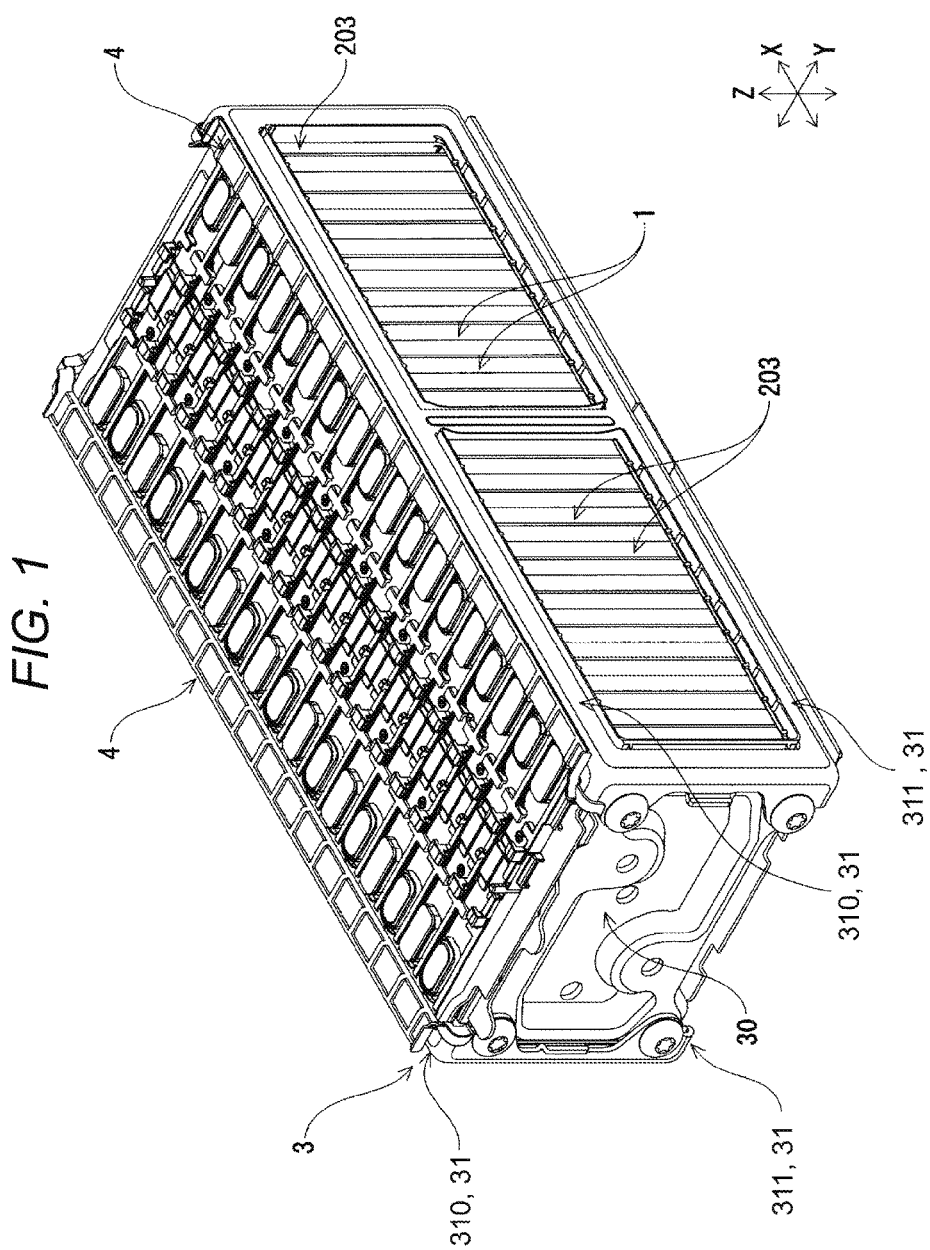
FIG. 1 is a perspective view of an energy storage apparatus according to one embodiment of the present invention.
Figure 2:
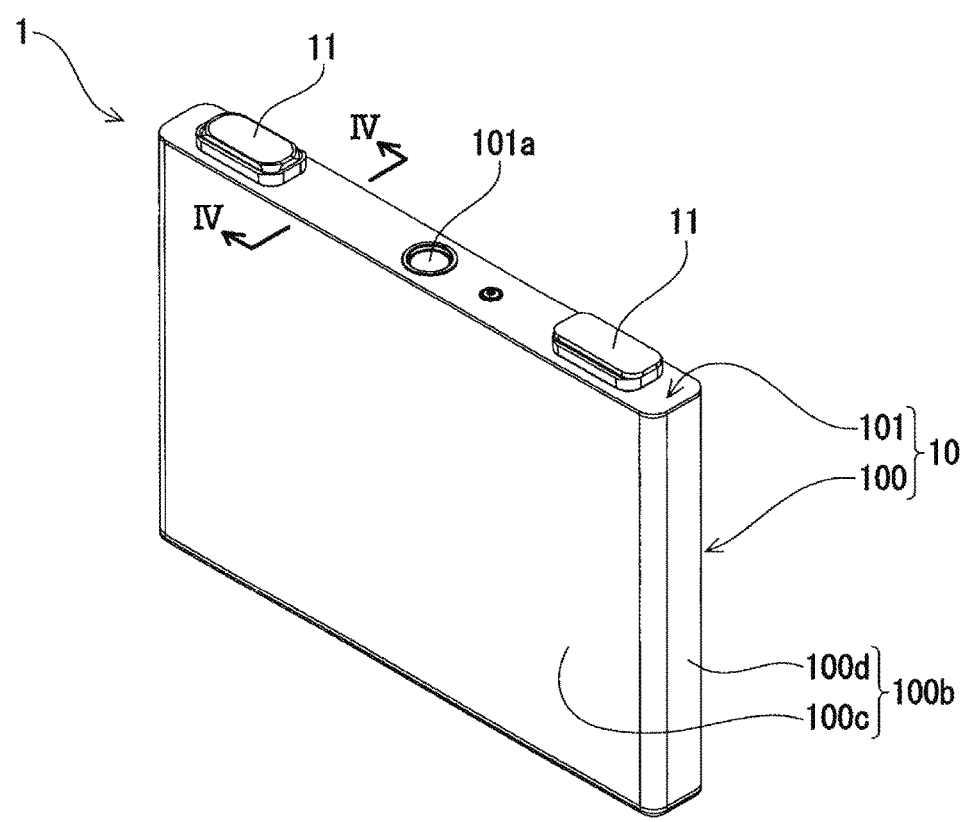
FIG. 2 is a perspective view of an energy storage device of the energy storage apparatus.
Figure 3:
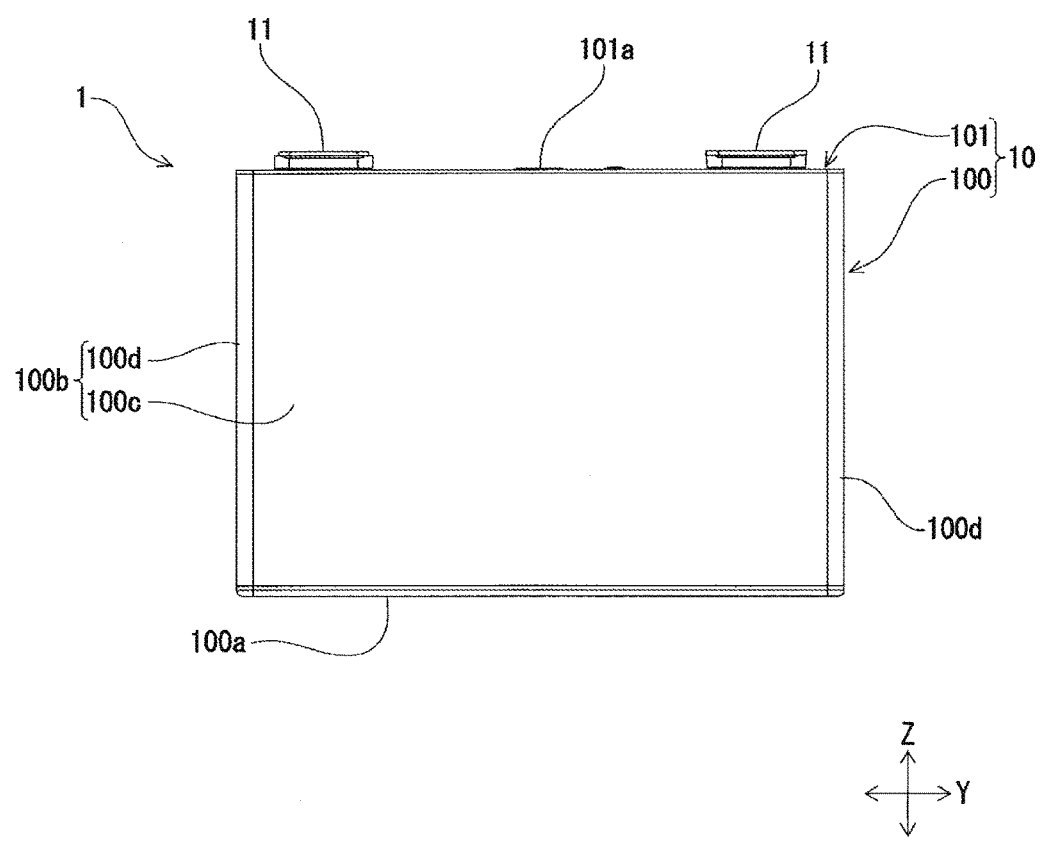
FIG. 3 is a front view of the energy storage device.

According to an aspect of the present invention, there is provided an energy storage apparatus which includes: an energy storage device including a flat electrode assembly in which electrodes are layered and a prismatic case in which the electrode assembly is housed; and a spacer arranged adjacently to the energy storage device in a first direction, wherein the spacer is formed such that a thickness size in the first direction of a center portion of the spacer in a second direction, which is a direction orthogonal to the first direction and is a direction parallel to a surface of the spacer that faces the energy storage device, is set larger than a thickness size in the first direction of other portions of the spacer arranged adjacently to the center portion of the spacer in the second direction, and a width of the center portion of the spacer in a third direction orthogonal to the first and second directions at a contact portion of the spacer with the energy storage device is set smaller than a width of the case in the third direction.

In this configuration, the width of the center portion of the spacer, of which thickness size is set larger than other portions of the spacer, at the contact portion with the energy storage device is set smaller than the width of the case and hence, the center portion can press portions of the case avoiding areas in the vicinity of side portions of the case having large strength. With such a configuration, the energy storage device and the spacer are held by a holder in a state where the energy storage device and the spacer are fastened together in the first direction and hence, it is possible to continuously apply a reaction force to the center portion of the electrode assembly effectively when the electrode assembly expands. Accordingly, it is possible to suppress the displacement of the electrodes of the electrode assembly caused by the expansion or the like of the electrode assembly brought about by the repetition of charging and discharging and the deterioration of the electrode.

In the energy storage apparatus, the electrodes which form the electrode assembly may have an active material layer, and a width in the third direction of the center portion of the spacer at the contact portion may be set equal to or larger than a width in the third direction of the active material layer of the electrode.

With such a configuration, a pressing force (reaction force) generated by the center portion of the spacer is applied to the whole active material layer portion of the electrode assembly having the larger degree of expansion or the like and hence, the displacement of the electrodes is minimally generated when the electrode assembly expands or the like.

In the energy storage apparatus, the electrodes which form the electrode assembly may have an active material layer, and the width in the third direction of the center portion of the spacer at the contact portion may be set smaller than a width in the third direction of the active material layer of the electrode.

With such a configuration, a contact area between the case and the center portion of the spacer is decreased and hence, a value of pressing force (reaction force) per unit area applied to the case from the spacer is increased. Accordingly, a reaction force can be continuously applied to the center portion of the electrode assembly more effectively when the electrode assembly expands.

In the energy storage apparatus, the spacer may have a base arranged adjacently to the energy storage device and extending along the energy storage device, the width in the third direction of the center portion of the base may be set smaller than the width in the third direction of the case, a shape of the base in cross section including the first direction and the second direction may be a rectangular corrugated shape, and an amplitude in the first direction of the center portion of the base may be set larger than an amplitude in the first direction of other portions of the base arranged adjacently to the center portion of the base in the second direction.

With such a configuration, passages which allow a fluid for cooling the energy storage device to flow therethrough in the third direction are formed between the energy storage device and the base. That is, according to the above-mentioned configuration, a reaction force can be effectively applied to the center portion of the electrode assembly in the second direction by making use of the configuration where the passages are formed (the configuration of forming the rectangular corrugated cross section).

In the energy storage apparatus, the spacer may include a base arranged adjacently to the energy storage device and extending along the energy storage device, and a plurality of projecting portions extending from the base toward the energy storage device arranged adjacently to the base, the projecting portions being arranged at intervals in the second direction, the plurality of projecting portions may be brought into contact with portions of the case excluding both end portions of the case in the third direction, and an extending amount of the projecting portions formed on the center portion of the base may be set larger than an extending amount of the projecting portions formed on other portions of the base arranged adjacently to the center portion of the base in the second direction.

With such a configuration, a space which allows a fluid for cooling the energy storage device to flow therethrough is formed between the energy storage device and the base. That is, according to the above-mentioned configuration, a reaction force can be effectively applied to the center portion of the electrode assembly in the second direction by making use of the configuration where the space is formed (the configuration where the projecting portions extend toward the energy storage device from the base).

In this case, the plurality of projecting portions may be ribs extending in the first direction and in the third direction.

With such a configuration, passages which allow a fluid for cooling the energy storage device to pass therethrough in the third direction are formed between the energy storage device and the base.

As has been described above, according to the aspects of the present invention, it is possible to provide the energy storage apparatus where electrodes which form an electrode assembly are minimally displaced from each other when charging and discharging are repeated in the electrode assembly.

Hereinafter, one embodiment of the present invention is described with reference to FIG. 1 to FIG. 10. Names of respective constitutional members (respective constitutional elements) of this embodiment are used only for this embodiment, and may differ from names of respective constitutional members (respective constitutional elements) in BACKGROUND.

As shown in FIG. 1, an energy storage apparatus includes: energy storage devices 1; spacers 2 which are arranged adjacently to the energy storage devices 1; and a holder 3 which collectively holds the energy storage devices 1 and the spacers 2. The holder 3 is formed by molding using an electrically conductive material. The energy storage apparatus includes insulators 4 which are disposed between the energy storage devices 1 and the holder 3.

As shown in FIG. 2 to FIG. 5, the energy storage device 1 includes: an electrode assembly 5 which includes a positive electrode 53 and a negative electrode 54; a prismatic case 10 which houses the electrode assembly 5; and a pair of external terminals 11 arranged on an outer surface of the case 10.

Figure 4:
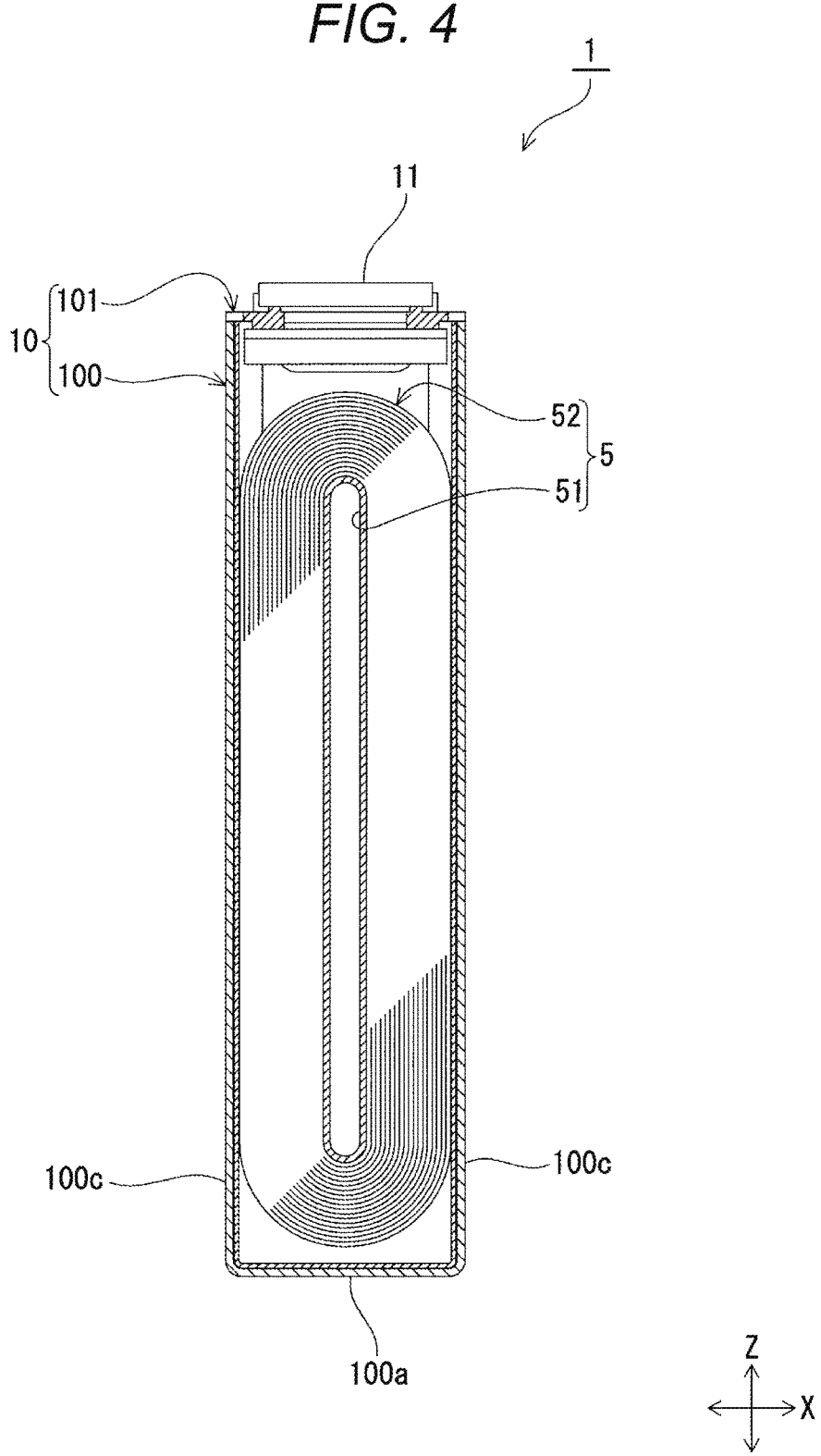
FIG. 4 is a cross-sectional view taken along a line IV-IV in FIG. 2.
Figure 5:
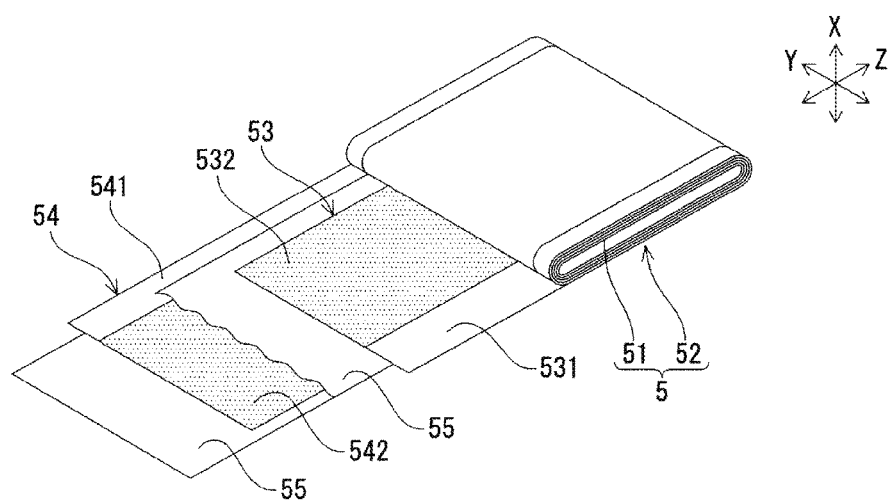
FIG. 5 is a perspective view of an electrode assembly of the energy storage device.

The electrode assembly 5 is formed by winding the electrodes 53, 54, and has a minor axis (a diameter in a lateral direction in FIG. 4) and a major axis (a diameter in a vertical direction in FIG. 4). That is, the electrode assembly 5 in this embodiment has a flat cylindrical shape. The electrode assembly 5 is specifically described hereinafter.

The electrode assembly 5 includes: a winding core 51; and a layered body 52 which is formed by layering the positive electrode (electrode having a positive polarity) 53 and the negative electrode (electrode having a negative polarity) 54 in a state where the positive electrode 53 and the negative electrode 54 are insulated from each other. The layered body 52 is wound around the winding core 51. In the electrode assembly 5, lithium ions move between the positive electrode 53 and the negative electrode 54 thus enabling charging and discharging of the energy storage device 1.

The winding core 51 is usually made of an insulating material. The winding core 51 has a cylindrical shape. In this embodiment, the winding core 51 has a flat cylindrical shape. In this embodiment, the winding core 51 is formed by winding a sheet having flexibility or thermoplasticity. The sheet is made of a synthetic resin, for example.

The layered body 52 is formed by layering (overlapping) the positive electrode 53 and the negative electrode 54 to each other, and is wound around the winding core 51.

The positive electrode 53 includes a metal foil and a positive active material layer formed on the metal foil. The metal foil has a strip shape. The metal foil in this embodiment is an aluminum foil, for example. The positive electrode 53 has a non-coated portion 531 which is not coated by the positive active material layer (a portion on which the positive active material layer is not formed) at one edge portion thereof in a width direction which is a short-length direction of the strip shape. In the positive electrode 53, a portion where the positive active material layer is formed is referred to as a coated portion 532. A thickness size of the coated portion (the portion on which the positive active material layer is formed) 532 of the positive electrode 53 is set larger than a thickness size of the non-coated portion (other portions) 531 of the positive electrode 53. In this embodiment, a positive active material which is used for forming the positive active material layer is a lithium metal oxide, for example.

The negative electrode 54 includes a metal foil and a negative active material layer formed on the metal foil. The metal foil has a strip shape. The metal foil in this embodiment is a copper foil, for example. The negative electrode 54 has a non-coated portion 541 which is not coated by the negative active material layer (a portion on which the negative active material layer is not formed) at the other edge portion (on a side opposite to the non-coated portion 531 of the positive electrode 53) in the width direction which is the short-length direction of the strip shape. A width of a coated portion (the portion on which the negative active material layer is formed) 542 of the negative electrode 54 is set larger than a width of the coated portion 532 of the positive electrode 53. A thickness size of the coated portion 542 of the negative electrode 54 is set larger than a thickness size of the non-coated portion (other portions) 541 of the negative electrode 54. In this embodiment, a negative active material which is used for forming the negative active material layer is hardly graphitizable carbon, for example.

In the electrode assembly 5 in this embodiment, the positive electrode 53 and the negative electrode 54 having the above-mentioned configurations are wound in a state where the positive electrode 53 and the negative electrode 54 are insulated from each other by the separator 55. That is, in the electrode assembly 5 in this embodiment, the layered body 52 formed of the positive electrode 53, the negative electrode 54 and the separator 55 is wound around the winding core 51. The separator 55 is a member having insulating property. The separator 55 is arranged between the positive electrode 53 and the negative electrode 54. Due to such arrangement, the positive electrode 53 and the negative electrode 54 are insulated from each other in the electrode assembly 5 (to be more specific, in the layered body 52). The separator 55 retains an electrolyte solution in the inside of the case 10. Accordingly, at the time of performing charging or discharging of the energy storage device 1, lithium ions move between the positive electrode 53 and the negative electrode 54 which are alternately layered with the separator 55 interposed therebetween.

The separator 55 has a strip shape. The separator 55 is formed using a porous membrane made of polyethylene, polypropylene, cellulose or polyamide, for example. A width (a size in a short-length direction of a strip shape) of the separator 55 is slightly larger than a width of the coated portion 542 of the negative electrode 54. The separator 55 is disposed between the positive electrode 53 and the negative electrode 54 which overlap with each other in a displaced manner in the width direction such that the coated portion 532 and the coated portion 542 overlap with each other. The electrode assembly 5 is formed by winding the positive electrode 53, the negative electrode 54 and the separator 55 which are in a layered state as described above (that is, the layered body 52) around the winding core 51.

The case 10 includes: a case body 100 having an opening; and a lid plate 101 which closes the opening of the case body 100. A pair of external terminals 11 is arranged on an outer surface of the lid plate 101.

The case body 100 includes: a closing portion 100a (see FIG. 3 and FIG. 4); and a cylindrical barrel portion 100b which is connected to a periphery of the closing portion 100a so as to surround the closing portion 100a.

The barrel portion 100b includes: a pair of first walls 100c which opposedly face each other with a distance therebetween; and a pair of second walls 100d which opposedly face each other with the pair of first walls 100c interposed therebetween.

The first wall 100c and the second wall 100d are respectively formed into a rectangular shape. The first wall 100c and the second wall 100d are arranged adjacently to each other in a state where respective end edges of the first and second walls 100c, 100d abut each other. In the first wall 100c and the second wall 100d which are arranged adjacently to each other, the end edge of the first wall 100c and the end edge of the second wall 100d are connected to each other over the entire length. Accordingly, the barrel portion 100b is formed into a prismatic cylindrical shape. One end of the barrel portion 100b is closed by the closing portion 100a. On the other hand, the other end of the barrel portion 100b of the case body 100 is opened. This opening is closed by the lid plate 101. In this embodiment, a surface area of the first wall 100c is set larger than a surface area of the second wall 100d. Accordingly, the barrel portion 100b has a flat prismatic cylindrical shape.

The energy storage apparatus according to this embodiment includes the plurality of energy storage devices 1. The plurality of energy storage devices 1 are arranged in a row in one direction (first direction). In this embodiment, the plurality of energy storage devices 1 are arranged in a row in a state where the first walls 100c of the cases 10 are directed in one direction (first direction). The energy storage apparatus includes bus bars not shown in the drawings each of which electrically connects the external terminals 11 of two energy storage devices 1 arranged adjacently to each other.

In the description made hereinafter, for the sake of convenience, the direction (the first direction: a direction of the minor axis of the electrode assembly 5) along which the energy storage devices 1 are arranged in a row is referred to as the X axis direction. Further, in a coordinate system (rectangular coordinate system) where three axes are orthogonal to each other at a right angle respectively, out of two axial directions which are orthogonal to the direction (X axis direction) along which the energy storage devices 1 are arranged in a row, one direction (the second direction: a direction of the major axis of the electrode assembly 5) is referred to as the Z axis direction, and the remaining one direction (third direction: the direction along the center of winding of the electrode assembly 5) is referred to as the Y axis direction. In other words, the Z axis direction (second direction) is a direction along which the lid plate 101 and the closing portion 100a which are wall portions of the case 10 arranged approximately parallel to each other are connected to each other. In accordance with such a coordinate system, in the respective drawings, three orthogonal axes (coordinate axes) which respectively correspond to the X axis direction, the Y axis direction and the Z axis direction are described complementarily.

The spacers 2 have insulating property, and are arranged adjacently to the energy storage devices 1 in the X axis direction. The spacer 2 includes: a base which is arranged adjacently to the energy storage device 1 (to be specific, the case 10, and to be more specific, the first wall 100c of the barrel portion 100b); and restricting portions which prevent the positional displacement of the energy storage device 1 arranged adjacently to the base.

Figure 6:
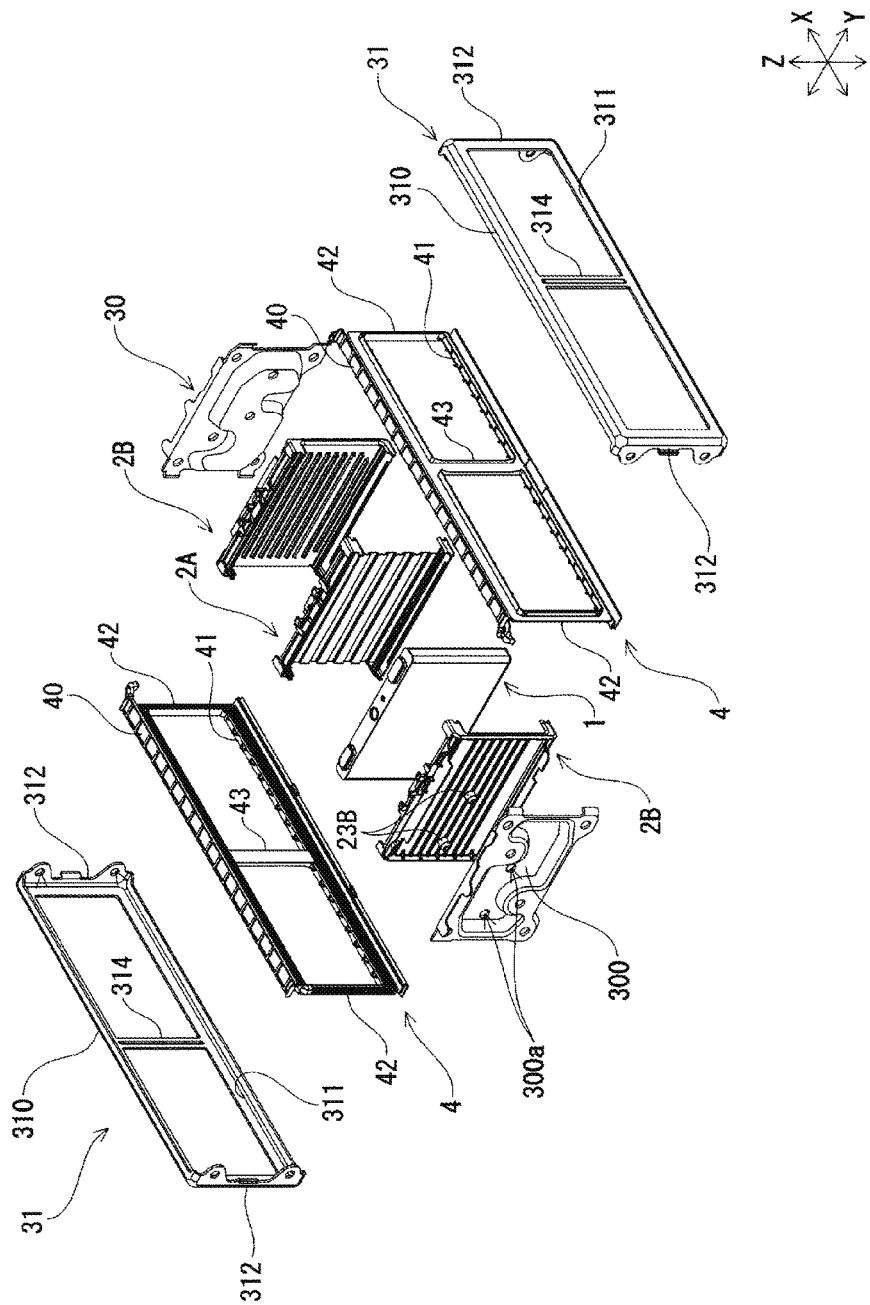
FIG. 6 is an exploded perspective view of the configuration of the energy storage apparatus with a part omitted.
Figure 7:
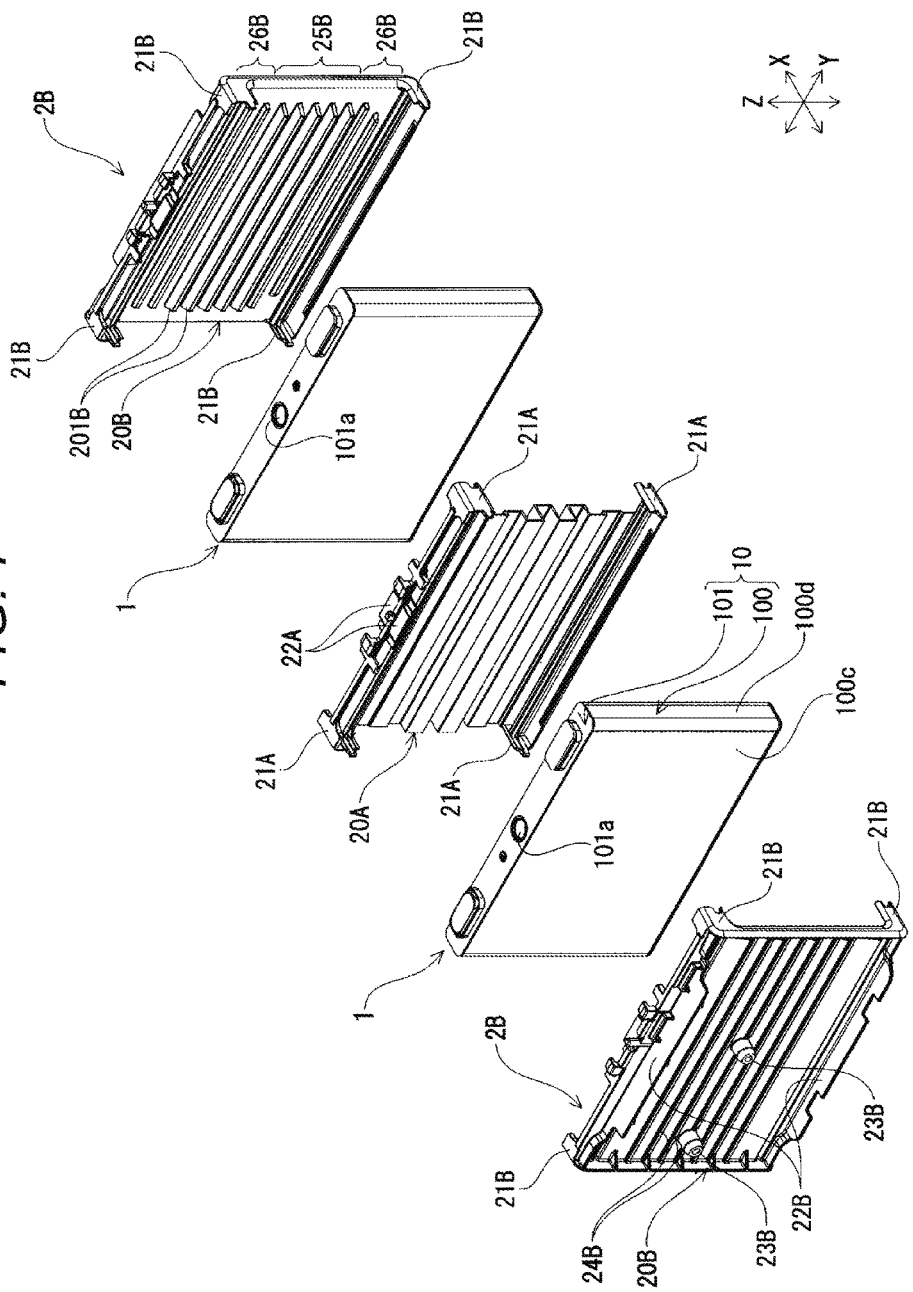
FIG. 7 is an exploded perspective view of the configuration of the energy storage apparatus with a part omitted.

The spacer 2 is described more specifically. As described above, the energy storage apparatus includes the plurality of energy storage devices 1. As shown in FIG. 6 and FIG. 7, the energy storage apparatus includes two kinds of spacers 2 (2A, 2B). That is, the energy storage apparatus includes spacers 2A each of which is arranged between two energy storage devices 1 (hereinafter referred to as "inner spacers"); and spacers 2B which are arranged adjacently to the outermost energy storage devices 1 out of the plurality of the energy storage devices 1 (hereinafter referred to as "outer spacers").

Figure 8:
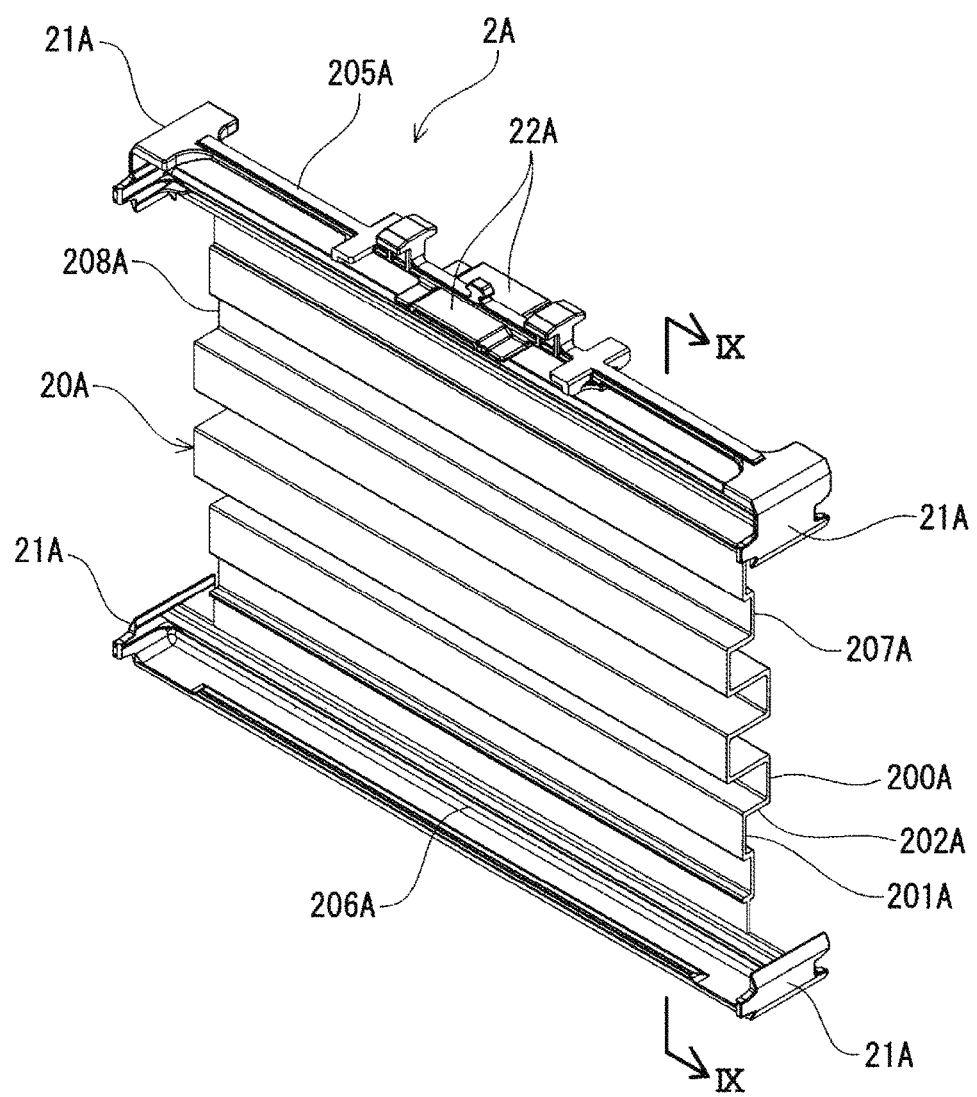
FIG. 8 is a perspective view of an inner spacer of the energy storage apparatus.
Figure 9:
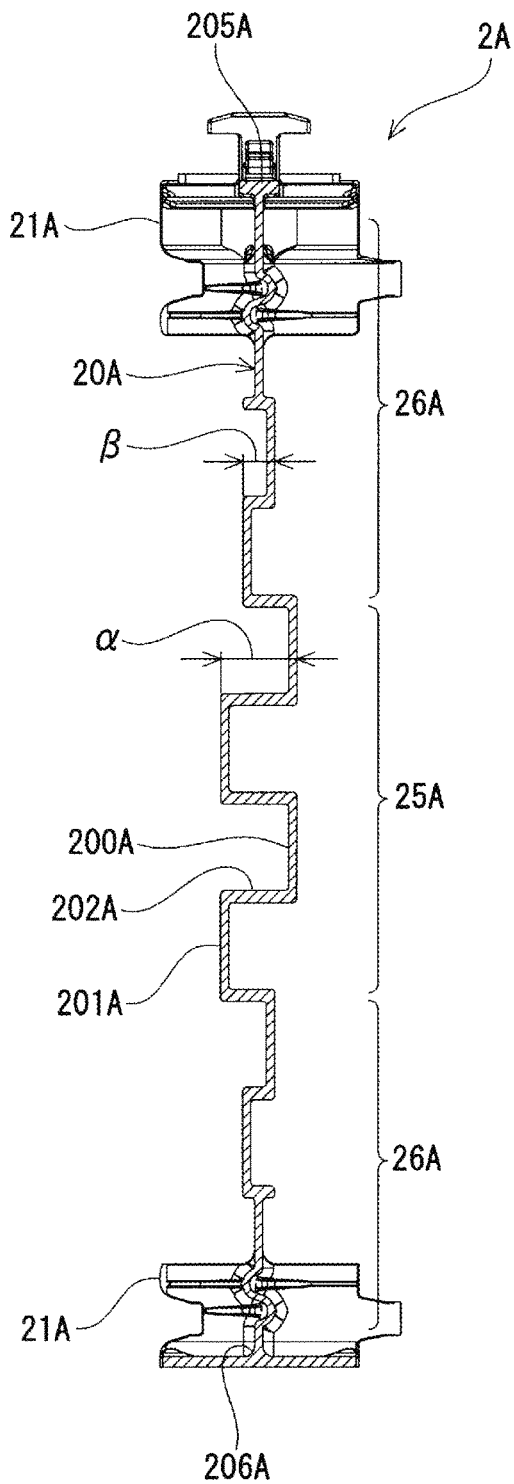
FIG. 9 is a cross-sectional view taken along a line IX-IX in FIG. 8.
Figure 10:
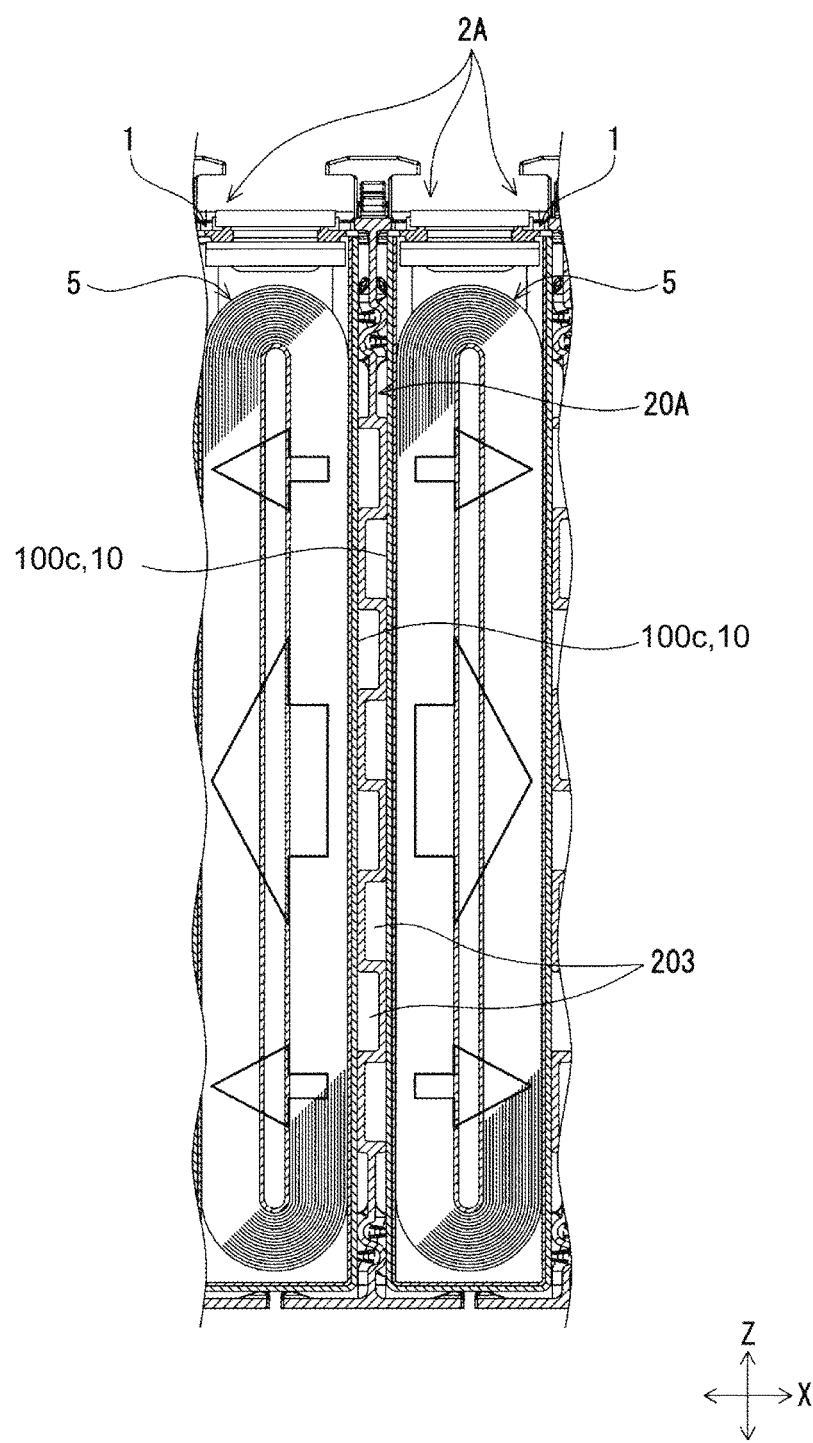
FIG. 10 is a schematic view describing a magnitude of a force applied to the energy storage devices from the inner spacer.

Firstly, the inner spacer 2A is described also with reference to FIG. 8 and FIG. 9. The inner spacer 2A is formed such that a thickness size in the X axis direction of the center portion 25A of the inner spacer 2A in the Z axis direction is set larger than a thickness size in the X axis direction of other portions 26A arranged adjacently to the center portion 25A of the inner spacer 2A (see FIG. 9). The inner spacer 2A is also formed such that a width (size) in the Y axis direction of the center portion 25A of the inner spacer 2A at contact portions of the inner spacer 2A with the energy storage device 1 is set smaller than a width (size) in the Y axis direction of the case 10 (to be more specific, first wall 100c). The inner spacer 2A is specifically described hereinafter.

Passages 203 through which a fluid (cooling fluid) for cooling the energy storage devices 1 can flow in the Y axis direction (second direction) are formed between the inner spacer 2A and the energy storage device 1 arranged adjacently to the inner spacer 2A (see FIG. 1). The inner spacer 2A includes: a base 20A arranged adjacently to the energy storage device 1 (the first wall 100c of the case body 100); and the restricting portions 21A which restrict the movement (positional displacement) of the energy storage device 1 arranged adjacently to the base 20A with respect to the base 20A in the Y axis direction and in the Z axis direction. The inner spacer 2A also includes valve cover portions 22A which project from the base 20A and are arranged on a lid plate 101 (gas release valve 101a) of the energy storage device 1.

The base 20A of the inner spacer 2A is sandwiched between two energy storage devices 1 arranged adjacently to each other. That is, the energy storage devices 1 each are arranged on both sides of the base 20A of the inner spacer 2A in the X axis direction. The base 20A extends along the energy storage device 1 (to be specific, the first wall 100c) arranged adjacently to the base 20A. The base 20A in this embodiment extends in the directions orthogonal to the X axis direction (Y-Z plane (plane including the Y axis and the Z axis) direction). The base 20A of the inner spacer 2A has: a first surface which opposedly faces one energy storage device 1 out of two energy storage devices 1 arranged adjacently to the base 20A; and a second surface which is arranged on a side opposite to the first surface and opposedly faces the other energy storage device 1 out of the two energy storage devices 1. The base 20A of the inner spacer 2A has a shape where both end portions in the Y axis direction of the base 20A having a rectangular shape elongated in the Y axis direction are cut away. The base 20A has a size corresponding to a size of the first wall 100c of the energy storage device 1.

The base 20A of the inner spacer 2A has: a first end 205A disposed at a position which corresponds to the lid plate 101 of the energy storage device 1; and a second end 206A disposed on a side opposite to the first end 205A at a position which corresponds to the closing portion 100a of the energy storage device 1 (see FIG. 8). The base 20A of the inner spacer 2A also has: a third end 207A disposed at a position which corresponds to one second wall 100d of the energy storage device 1; and a fourth end 208A disposed on a side opposite to the third end 207A at a position which corresponds to the other second wall 100d of the energy storage device 1 (see FIG. 8).

The third end 207A and the fourth end 208A each are cut away toward the inside in the Y axis direction while leaving the restricting portions 21A extending from four corners of the base 20A. In this embodiment, the third end 207A and the fourth end 208A are cut away in a rectangular shape. With such a configuration, a width in the Y axis direction of a portion of the base 20A of the inner spacer 2A at the position where the third end 207A and the fourth end 208A are cut away is set smaller than a width in the Y axis direction of the energy storage device 1. That is, a width in the Y axis direction of the center portion of the base 20A of the inner spacer 2A is set smaller than a width in the Y axis direction of the case 10. In this embodiment, the width in the Y axis direction of the base 20A of the inner spacer 2A is substantially equal to or slightly larger than widths in the Y axis direction of the active material layers (at least one of the positive active material layer and the negative active material layer) of the electrodes 23, 24 which form the electrode assembly 5 housed in the case 10 of the energy storage device 1 arranged adjacently to the base 20A, for example. The center portion of the base 20A of the inner spacer 2A and the above-mentioned center portion 25A of the inner spacer 2A are the same. Accordingly, both the center portion of the base 20A of the inner spacer 2A in the Z axis direction and the center portion 25A of the inner spacer 2A are referred to as "center portion 25A" using the same symbol hereinafter. Further, other portions of the base 20A of the inner spacer 2A arranged adjacently to the center portion 25A of the base 20A of the inner spacer 2A and the above-mentioned other portions 26A of the inner spacer 2A are the same. Accordingly, both the other portions of the base 20A of the inner spacer 2A arranged adjacently to the center portion 25A of the base 20A of the inner spacer 2A in the Z axis direction and the other portions 26A of the inner spacer 2A are referred to as "other portions 26A" using the same symbol hereinafter.

In the base 20A of the inner spacer 2A in this embodiment, passages 203 which allow a cooling fluid (a fluid for cooling) to pass therethrough are formed in at least one of a space formed between the first surface of the base 20A and the energy storage device 1 and a space formed between the second surface of the base 20A and the energy storage device 1.

The cross section (cross section in the X-Z plane (plane including the X axis and the Z axis) direction) of the base 20A of the inner spacer 2A has a rectangular corrugated shape. This configuration of the inner spacer 2A is described more specifically. The base 20A of the inner spacer 2A includes: first contact portions 200A which are brought into contact with only one energy storage device 1 out of two energy storage devices 1 arranged adjacently to the base 20A; second contact portions 201A which are brought into contact with only the other energy storage device 1 out of two energy storage devices 1 arranged adjacently to the base 20A; and connecting portions 202A which connect the first contact portions 200A and the second contact portions 201A to each other. The first contact portions 200A are elongated in the Y axis direction. The second contact portions 201A are elongated in the Y axis direction.

In this embodiment, the base 20A of the inner spacer 2A includes a plurality of first contact portions 200A and a plurality of second contact portions 201A. The first contact portion 200A and the second contact portion 201A are alternately arranged in the Z axis direction.

With this configuration, in the energy storage apparatus, the passage 203 is formed by the surface of the first contact portion 200A on a side opposite to the surface which is brought into contact with the energy storage device 1 and the pair of connecting portions 202A which is connected to the first contact portion 200A. A cooling fluid (for example, air) for cooling the energy storage device 1 is supplied to the passages 203. The passages 203 extend in the Y axis direction, and allow the cooling fluid to flow therethrough in the Y axis direction while bringing the cooling fluid into contact with the first wall 100c of the energy storage device 1. Further, in the energy storage apparatus, the passages 203 is formed by the surface of the second contact portion 201A on a side opposite to the surface which is brought into contact with the energy storage device 1 and the pair of connecting portions 202A which is connected to the second contact portion 201A. The passages 203 also extend in the Y axis direction, and allow the cooling fluid to flow therethrough in the Y axis direction while bringing the cooling fluid into contact with the first wall 100c of the energy storage device 1. As described above, in the energy storage apparatus in this embodiment, the passages 203 are formed between the first surface of the base 20A of the inner spacer 2A and the energy storage device 1 and between the second surface of the base 20A of the inner spacer 2A and the energy storage device 1 respectively. Further, the passage 203 on the side of the first surface of the base 20A of the inner spacer 2A and the passage 203 on the side of the second surface of the base 20A of the inner spacer 2A are alternately formed in the Z axis direction between the common energy storage devices 1 (see FIG. 10).

As shown in FIG. 9, in the base 20A in this embodiment, an amplitude α in the X axis direction of the center portion 25A is larger than an amplitude β in the X axis direction of the other portions 26A. Sizes of amplitudes α, β are set such that the first contact portions 200A of the base 20 of the inner spacer 2A and the second contact portion 201A of the base 20 of the inner spacer 2A are brought into contact with two energy storage devices 1 arranged adjacently to the inner spacer 2A respectively when the energy storage devices 1 and the spacer 2 are held by the holder 3 such that the energy storage devices 1 and the spacer 2 are fastened together in the X axis direction (see FIG. 10). In FIG. 9, to facilitate the understanding of the difference between the amplitude α of the center portion 25A and the amplitudes β of the other portions 26A, the amplitude of the center portion 25A is represented exaggeratingly.

The restricting portions 21A suppress (restrict) the positional displacement of the energy storage devices 1 on both sides in the X axis direction with respect to the inner spacer 2A (base 20A) in the Y-Z plane direction. Accordingly, the restricting portions 21A can restrict the relative movement between two energy storage devices 1 arranged adjacently to the inner spacer 2A. To be more specific, the restricting portions 21A extend to both sides in the X axis direction from the base 20 respectively. That is, the restricting portions 21A extend toward the energy storage device 1 arranged adjacently to the first surface of the base 20A of the inner spacer 2A from the base 20A, and also extend toward the energy storage device 1 arranged adjacently to the second surface of the base 20A of the inner spacer 2A from the base 20A of the inner space 2A. These restricting portions 21A hold (constrain) four corners of the energy storage device 1 thus restricting the positional displacement of the energy storage device 1 with respect to the inner spacer 2A (base 20A) in the Y-Z plane direction.

The energy storage apparatus of this embodiment includes the plurality of energy storage devices 1 as described above, and the inner spacer 2A is arranged between two energy storage devices 1 arranged adjacently to each other. Accordingly, the energy storage apparatus of this embodiment includes the plurality of inner spacers 2A.

Next, the outer spacer 2B is described. As shown in FIG. 6 and FIG. 7, the outer spacer 2B is formed such that a thickness size in the X axis direction of the center portion 25B of the outer spacer 2B in the Z axis direction is set larger than a thickness size in the X axis direction of other portions 26B arranged adjacently to the center portion 25B of the outer spacer 2B. The outer spacer 2B is also formed such that a width (size) in the Y axis direction of the center portion 25B of the outer spacer 2B at contact portions (distal ends of inner contact portions 201B described later in this embodiment) with the energy storage device 1 is set smaller than a width (size) in the Y axis direction of the case 10 (to be more specific, first wall 100c). The outer spacer 2B is specifically described hereinafter.

The outer spacer 2B includes: a base 20B arranged adjacently to the energy storage device 1 in the X axis direction; and inner contact portions 201B which extend toward the energy storage device 1 arranged adjacently to the base 20B from the base 20B. The outer spacer 2B also includes restricting portions 21B which suppress the positional displacement of the energy storage device 1 arranged adjacently to base 20B with respect to the base 20B. The outer spacer 2B also includes external contact portions 24B which project toward the end plate 30 from the base 20B (see FIG. 6). With respect to the outer spacer 2B in this embodiment, passages 203 which allow a cooling fluid to pass therethrough are formed between the first surface of the base 20B of the outer spacer 2B and the energy storage device 1 by means of the inner contact portions 201B.

The base 20B of the outer spacer 2B extends along the energy storage device 1 (to be specific, the first wall 100c) arranged adjacently to the base 20B in the X axis direction. The base 20B in this embodiment is a plate-like portion which extends in the Y-Z plane direction. The base 20B of the outer spacer 2B has: a first surface which opposedly faces the energy storage device 1 arranged adjacently to the base 20B; and a second surface which is arranged on a side opposite to the first surface and opposedly faces the end plate 30 of the holder 3. In this embodiment, the base 20B of the outer spacer 2B is a portion having an approximately rectangular plate shape. The base 20B of the outer spacer 2B has substantially the same size as the first wall 100c of the energy storage device 1.

The inner contact portions 201B extend (project) from the base 20B of the outer spacer 2B in the X axis direction and in the Y axis direction. That is, the inner contact portions 201B in this embodiment have a rib shape. A plurality of inner contact portions 201B are formed on the base 20B of the outer spacer 2B. The plurality of inner contact portions 201B are arranged parallel to each other at intervals in the Z axis direction (a direction orthogonal to a long-length direction of the inner contact portion 201B). A length in the Y axis direction of the plurality of inner contact portions 201B is set smaller than a length in the Y axis direction of the energy storage device 1 (to be more specific, the first wall 100c) arranged adjacently to the base 20B of the outer spacer 2B. In this embodiment, all lengths of the plurality of inner contact portions 201B in the Y axis direction are equal. A width in the Y axis direction of the inner contact portion 201B of the outer spacer 2B is substantially equal to or slightly larger than a width in the Y axis direction of the active material layer (at least one of the positive active material layer and the negative active material layer) of the electrode assembly 5 housed in the case 10 of the energy storage device 1 arranged adjacently to the outer spacer 2B, for example. An extending amount (projecting amount) in the X axis direction of the inner contact portion 201B formed on the center portion of the base 20B of the outer spacer 2B is set larger than an extending amount (projecting amount) in the X axis direction of the inner contact portion 201B formed on other portions of the base 20B arranged adjacently to the center portion of the base 20B. The center portion of the base 20B of the outer spacer 2B and the above-mentioned center portion 25B of the outer spacer 2B are the same. Accordingly, both the center portion of the base 20B of the outer spacer 2B in the Z axis direction and the center portion 25B of the outer spacer 2B are referred to as "center portion 25B" using the same symbol hereinafter. Further, the other portions of the base 20B of the outer spacer 2B arranged adjacently to the center portion 25B of the base 20B of the outer spacer 2B and the above-mentioned other portions 26B of the outer spacer 2B are the same. Accordingly, both the other portions of the base 20B of the outer spacer 2B arranged adjacently to the center portion 25B of the base 20B of the outer spacer 2B in the Z axis direction and the other portions 26B of the outer spacer 2B are referred to as "other portions 26B" using the same symbol hereinafter.

The restricting portions 21B restrict the positional displacement (relative movement) of the energy storage device 1 arranged adjacently to the first surface of the outer spacer 2B with respect to the base 20B. The restricting portions 21B extend toward the energy storage device 1 arranged adjacently to the first surface of the base 20B from the base 20B of the outer spacer 2B. These restricting portions 21B hold (constrain) four corners of the energy storage device 1 thus restricting the positional displacement of the energy storage device 1 with respect to the outer spacer 2B (base 20B) in the Y-Z plane direction.

The external contact portions 24B project toward the end plate 30 from the base 20B of the outer spacer 2B, and are brought into contact with the end plate 30. Accordingly, in the energy storage apparatus, a gap is formed between the outer spacer 2B and the end plate 30.

In this embodiment, the base 20B of the outer spacer 2B and the end plate 30 of the holder 3 opposedly face each other. That is, the outer spacer 2B is arranged between the energy storage device 1 and the end plate 30. Because of such a configuration, the outer spacer 2B has fitting portions 22B which engage with the end plate 30 at positions on the base 20B which opposedly face the end plate 30. That is, the outer spacer 2B has the fitting portions 22B which are provided for determining the position of the end plate 30 with respect to the base 20B and are formed on the second surface of the base 20B. The outer spacer 2B also includes shaft portions 23B which are provided for determining the position of the end plate 30 with respect to the base 20B and project from the second surface of the base 20B.

The energy storage apparatus of this embodiment includes a pair of outer spacers 2B having the above-mentioned configuration. The outer spacers 2B are arranged adjacently to the outermost energy storage devices 1 out of the plurality of energy storage devices 1. That is, the pair of outer spacers 2B is provided so as to sandwich the plurality of arranged energy storage devices 1 arranged in a row in the X axis direction.

The holder 3 holds the energy storage devices 1 and the spacers 2 so as to fasten the energy storage devices 1 and the spacer 2 in the X axis direction. To be more specific, as shown in FIG. 1 and FIG. 6, the holder 3 includes: a pair of end plates 30 which is arranged on outer sides of the plurality of energy storage devices 1 arranged in a row in the X axis direction; and frames 31 which connect the pair of end plates 30 to each other.

The pair of end plates 30 extends along the energy storage devices 1 (to be more specific, the first walls 100c). The end plates 30 in this embodiment extend in the Y-Z plane direction. The end plate 30 has: a first surface which opposedly faces the outer spacer 2B; and a second surface on a side opposite to the first surface. In this embodiment, the end plate 30 has an approximately rectangular shape (a shape corresponding to a shape of the energy storage device 1) as viewed in the X axis direction. The end plate 30 includes a pressure contact portion 300 which is brought into contact with the external contact portions 24B which extend from the base 20B of the outer spacer 2B. The pressure contact portion 300 has insertion holes 300a formed at positions which correspond to the shaft portions 23B of the outer spacer 2B. The shaft portions 23B of the outer spacer 2B are inserted into the insertion holes 300a.

The frame 31 includes: a plurality of (two in the example of this embodiment) connecting portions 310, 311 which connect the pair of end plates 30 to each other and extend along corner portions of the plurality of energy storage devices 1 arranged in a row with the inner spacers 2A interposed therebetween; and at least one reinforcing portion 314 for reinforcing the connecting portions 310, 311. In this embodiment, the holder 3 has the frame 31 at one end and the other end thereof in the Y axis direction. The pair of frames 31 respectively includes: a first connecting portion 310 arranged at a position which corresponds to the lid plates 101 of the energy storage devices 1; and a second connecting portion 311 arranged at a position which corresponds to the closing portions 100a of the energy storage devices 1. The first connecting portion 310 extends in the X axis direction. In the same manner as the first connecting portion 310, the second connecting portion 311 also extends in the X axis direction. The frame 31 includes support portions 312 which connect the first connecting portion 310 and the second connecting portion 311 to each other. The support portions 312 connect the corresponding end portions of the pair of connecting portions (the first connecting portion 310 and the second connecting portion 311) arranged on the same side in the Y axis direction with respect to the energy storage device 1. The frame 31 also includes: the reinforcing portion 314 which connects intermediate portions of the first and second connecting portions 310, 311 in the Z axis direction.

Both end portions in the X axis direction of the frames 31 having the above-mentioned configuration (to be more specific, both end portions of the first connecting portions 310 and both end portions of the second connecting portion 311) are fixed to the pair of end plates 30. By fixing both end portions of the frame 31 to the end plates 30, the pair of end plates 30 fastens the energy storage devices 1 and the spacers 2 together in the X axis direction.

The insulator 4 is made of a material having insulating property, and insulates the energy storage devices 1 and the holder 3 from each other. As shown in FIG. 1 and FIG. 6, the energy storage apparatus of this embodiment includes a pair of insulators 4. Each of the pair of insulators 4 includes: a first insulating portion 40 arranged between the first connecting portion 310 and the spacers 2 (the inner spacers 2A and the outer spacers 2B); and a second insulating portion 41 arranged between the second connecting portion 311 and the spacers 2 (the inner spacers 2A and the outer spacers 2B).

The insulator 4 also includes third insulating portions 42 which connect the first insulating portion 40 and the second insulating portion 41 to each other, and each of which is arranged between the outer spacer 2B and the support portion 312 of the frame 31. The insulator 4 also includes a fourth insulating portion 43 which connects a middle portion of the first insulating portion 40 and a middle portion of the second insulating portion 41 to each other, and is arranged between the energy storage device 1 and the reinforcing portion 314 of the frame 31.

In the energy storage apparatus having the above-mentioned configuration, with respect to the spacers 2 (the inner spacers 2A and the outer spacers 2B), the width of the center portion 25A, 25B at the contact portions with the energy storage devices 1 having a larger thickness size in the X axis direction (amplitude in cross section having a rectangular corrugated shape in case of the inner spacer 2A, an extending amount of the inner contact portion 201B in case of the outer spacer 2B) than the other portions 26A, 26B is set smaller than the width of the case 10. Accordingly, the center portion 25A, 25B can press portions of the first wall 100c (a surface which opposedly faces the spacer 2) of the case 10 avoiding areas in the vicinity of side portions (portions connected with the second walls 100d) of the case 10 having large strength (see FIG. 10). With such a configuration, the energy storage devices 1 and the spacers 2 can be held by the holder 3 in a state where the energy storage devices 1 and the spacers 2 are fastened together in the X axis direction and hence, it is possible to effectively apply a reaction force to the center portion of the electrode assembly 5 in the Z axis direction when the electrode assembly 5 expands. As a result, it is possible to suppress the displacement of the electrodes 53, 54 in the winding direction of the electrode assembly 5 caused by the expansion, the shrinkage or the like of the electrode assembly 5 brought about by the repetition of charging and discharging of the energy storage device 1 and the deterioration of the electrodes 53, 54.

In the energy storage apparatus of this embodiment, the width in the Y axis direction of the center portion 25A, 25B of the spacer 2 at the contact portion with the energy storage device 1 is set equal to or slightly larger than a width in the Y axis direction of the active material layers of the electrodes 53, 54. Accordingly, a pressing force (reaction force) generated by the center portion 25A, 25B of the spacer 2 is applied to the whole active material layer portions of the electrodes 53, 54 having the larger degree of expansion or the like and hence, the displacement of the electrodes 53, 54 in the winding direction is minimally generated when the electrode assembly 5 expands, shrinks or the like.

In the energy storage apparatus of this embodiment, a shape of the base 20A of the inner spacer 2A in cross section in the X-Z plane direction is a rectangular corrugated shape. An amplitude α in the X axis direction of the center portion 25A of the base 20A of the inner spacer 2A is set larger than an amplitude β in the X axis direction of the other portions 26A of the base 20A (see FIG. 9). With such a configuration, a reaction force can be effectively applied to the center portion of the electrode assembly 5 in the direction of a major axis (Z axis direction) by making use of the configuration for forming the passages 203 (the configuration where the base 20A of the inner spacer 2A has a rectangular corrugated cross section).

The energy storage apparatus according to the present invention is not limited to the above-mentioned embodiment, and it is needless to say that various modifications are conceivable without departing from the gist of the present invention.

The energy storage device 1 of the energy storage apparatus according to the above-mentioned embodiment includes the so-called winding-type electrode assembly 5 formed by winding strip-shaped electrodes (the positive electrode 53 and the negative electrode 54). However, the configuration of the energy storage device 1 is not limited to such a configuration. The energy storage device 1 may include a so-called layered-type electrode assembly 5 where sheet-like electrodes (positive electrodes 53 and negative electrodes 54) are layered to each other. Also with such a configuration, a reaction force can be continuously applied to the center portion of the electrode assembly 5 effectively when the electrode assembly 5 expands. Accordingly, it is possible to suppress the displacement of the electrodes 53, 54 of the electrode assembly 5 caused by the expansion or the like of the electrode assembly 5 brought about by the repetition of charging and discharging of the energy storage device 1 and the deterioration of the electrodes 53, 54.

In the winding-type electrode assembly 5, the center portion of the electrode assembly 5 in the direction of the major axis (Z axis direction) easily expands. Accordingly, in the winding-type electrode assembly 5, it is possible to more effectively suppress the displacement of the electrodes 53, 54 of the electrode assembly 5 caused by the expansion or the like of the electrode assembly 5 brought about by the repetition of charging and discharging of the energy storage device 1 and the deterioration of the electrodes 53, 54. That is, in the energy storage device 1 which includes the winding-type electrode assembly 5, it is possible to acquire a more remarkable displacement suppressing effect. Further, a hollow winding-type electrode assembly 5 shown in FIG. 4 and FIG. 10 can acquire a more remarkable effect in suppressing displacement of the electrodes 53, 54 in the electrode assembly 5 than a solid winding-type electrode assembly (not shown in the drawing). That is, in a hollow winding-type electrode assembly 5, a linear portion (a portion extending in the Z axis direction and opposedly facing the first wall 100c in FIG. 4) of the electrode assembly 5 deflects (shifts) to a hollow portion side and hence, a reaction force is not sufficiently applied to the electrodes 53, 54 whereby the electrodes 53, 54 are easily displaced (an amount of displacement is large) compared with a solid winding-type electrode assembly. However, as described in the above-mentioned embodiment, by adopting the configuration where a sufficient pressing force is positively applied to the center portion of the case 10 (to be more specific, first wall 100c) by the spacer 2, a sufficient reaction force (pressing force) is applied to the electrodes 53, 54 and, as a result, a displacement amount of the electrodes 53, 54 in the electrode assembly 5 can be largely suppressed compared to a solid winding-type electrode assembly.

Figure 11:
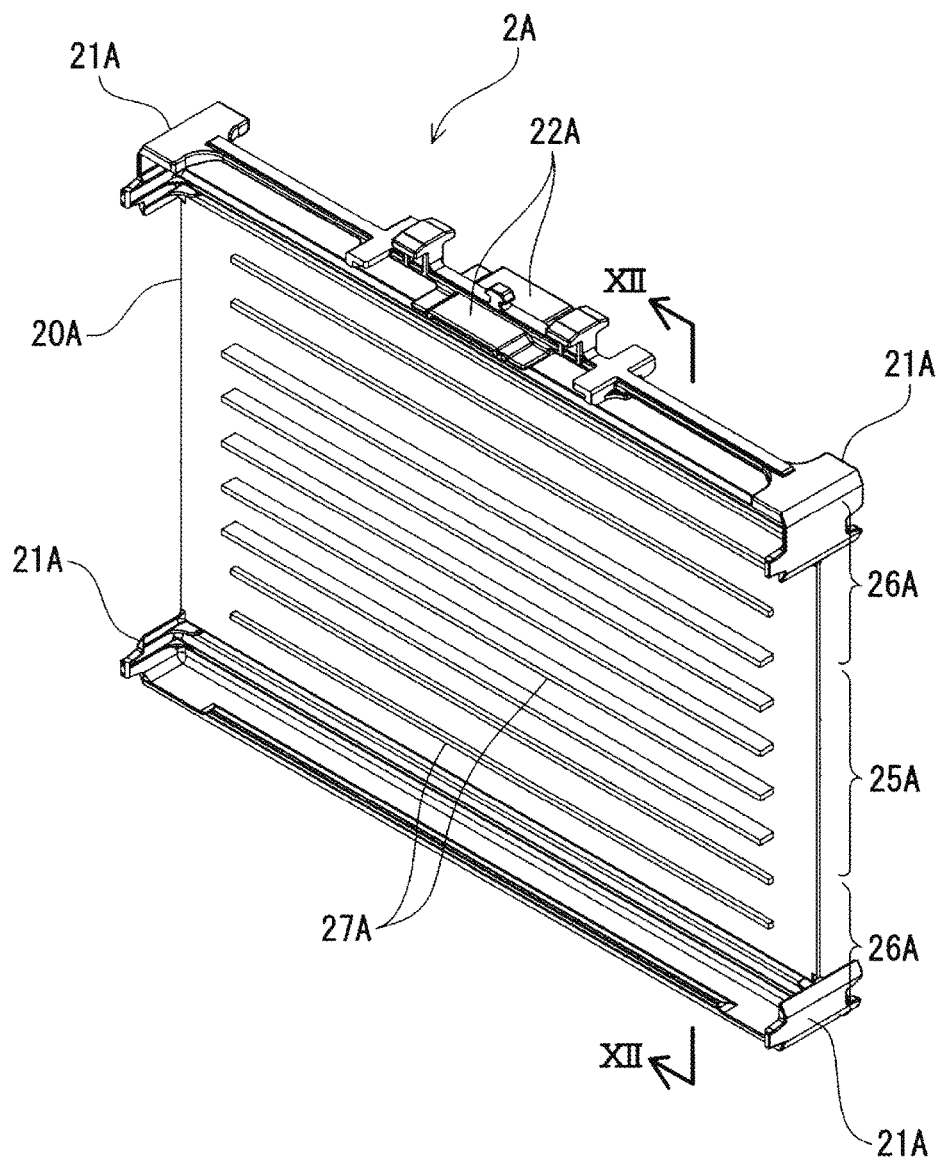
FIG. 11 is a perspective view of an inner spacer according to another embodiment.
Figure 11:
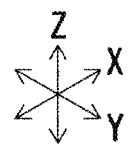
Figure 12:
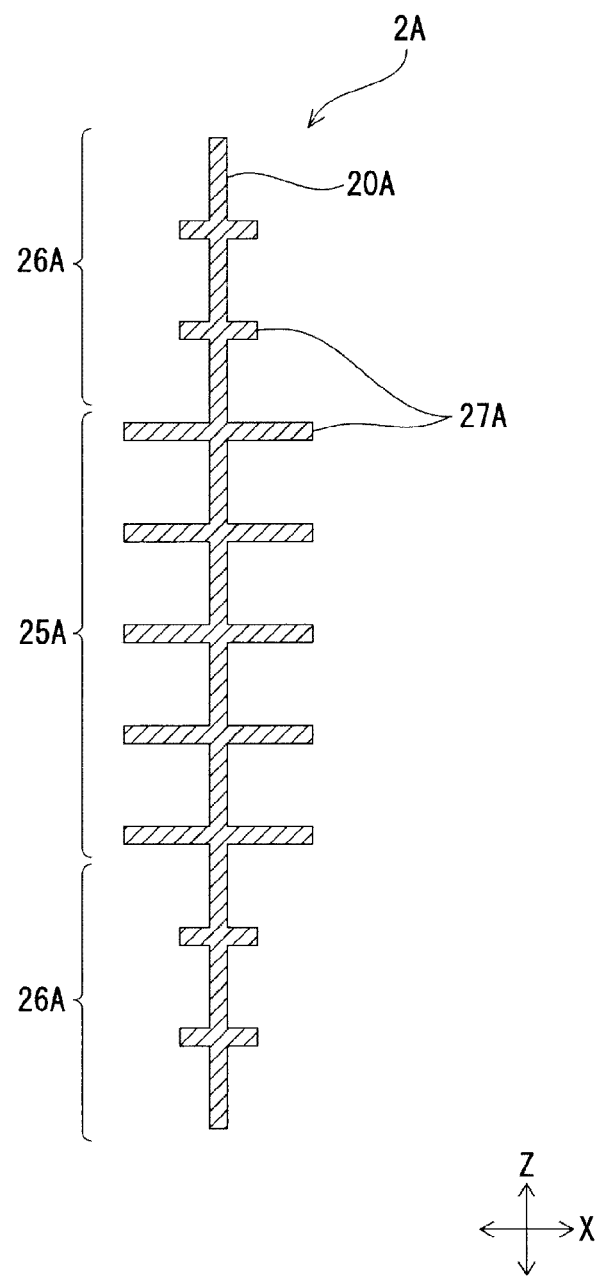
FIG. 12 is a schematic cross-sectional view taken along a line XII-XII in FIG. 11.

In the above-mentioned embodiment, the inner spacer 2A has a rectangular corrugated shape in cross section. However, the shape of the cross section of the inner spacer 2A is not limited to such a shape. In the same manner as the outer spacer 2B, the inner spacer 2A may be configured such that, as shown in FIG. 11 and FIG. 12, a plurality of ribs 27A extending in the X axis direction and in the Y axis direction are formed on a plate-like base 20A. Also with such a configuration, an extending amount (projecting amount) in the X axis direction of the ribs 27A formed on the center portion 25A of the inner spacer 2A is set larger than an extending amount (projecting amount) in the X axis direction of the rib 27A formed on the other portions 26A of the inner spacer 2A. Further, a length in the Y axis direction of the ribs 27A formed on the center portion 25A of the inner spacer 2A is set smaller (shorter) than a width in the Y axis direction of the energy storage device 1.

In such a configuration, the whole width in the Y axis direction of the base 20A of the inner spacer 2A may be set equal to a width in the Y axis direction of the energy storage device 1 (to be more specific, first wall 100e) arranged adjacently to the base 20A. Alternatively, a width in the Y axis direction of the center portion 25A may be set equal to a width (size) of the ribs 27A. The length in the Y axis direction of the ribs 27A formed on the other portions 26A of the inner spacer 2A is not limited. The length in the Y axis direction of the ribs 27A formed on the other portions 26A of the inner spacer 2A may be set smaller than or equal to a width in the Y axis direction of the energy storage device 1 arranged adjacently to the inner spacer 2A, for example. In FIG. 12, to facilitate the understanding of the difference in an extending amount of the ribs 27A, the extending amount in the X axis direction of the ribs 27A formed on the center portion 25A of the inner spacer 2A is represented exaggeratingly.

In the above-mentioned embodiment, the inner spacer 2A has a rectangular corrugated shape in cross section, and the outer spacer 2B includes the base 20B and the inner contact portions (ribs) 201B extending from the base 20B. However, the configurations of the spacers 2 (inner spacer 2A, outer spacer 2B) are not limited to such configurations. It is sufficient that the spacer 2 includes: a base 20A, 20B which is arranged adjacently to the energy storage device 1 and extends along the energy storage device 1; and a plurality of projecting portions which extend toward the energy storage device 1 arranged adjacently to the base 20A, 20B from the base 20A, 20B and are arranged at intervals in the Z axis direction. The plurality of projecting portions are brought into contact with portions of the first wall 100c of the case 10 excluding both end portions (areas in the vicinity of portions joined to the second wall 100d) of the first wall 100c of the case 10 in the Y axis direction. Also in this case, an extending amount of the projecting portions formed on the center portion 25A, 25B of the spacer 2 is set larger than an extending amount of the projecting portions formed on the other portions 26A, 26B of the spacer 2.

With such a configuration, a space which allows a cooling fluid for cooling the energy storage device 1 to flow therethrough is formed between the energy storage device 1 and the base 20A, 20B. Accordingly, a reaction force can be effectively applied to the center portion of the electrode assembly 5 in a direction of the major axis (Z axis direction) by making use of the configuration which forms the space (the configuration where the projecting portions extend from the base 20A, 20B).

Figure 13:
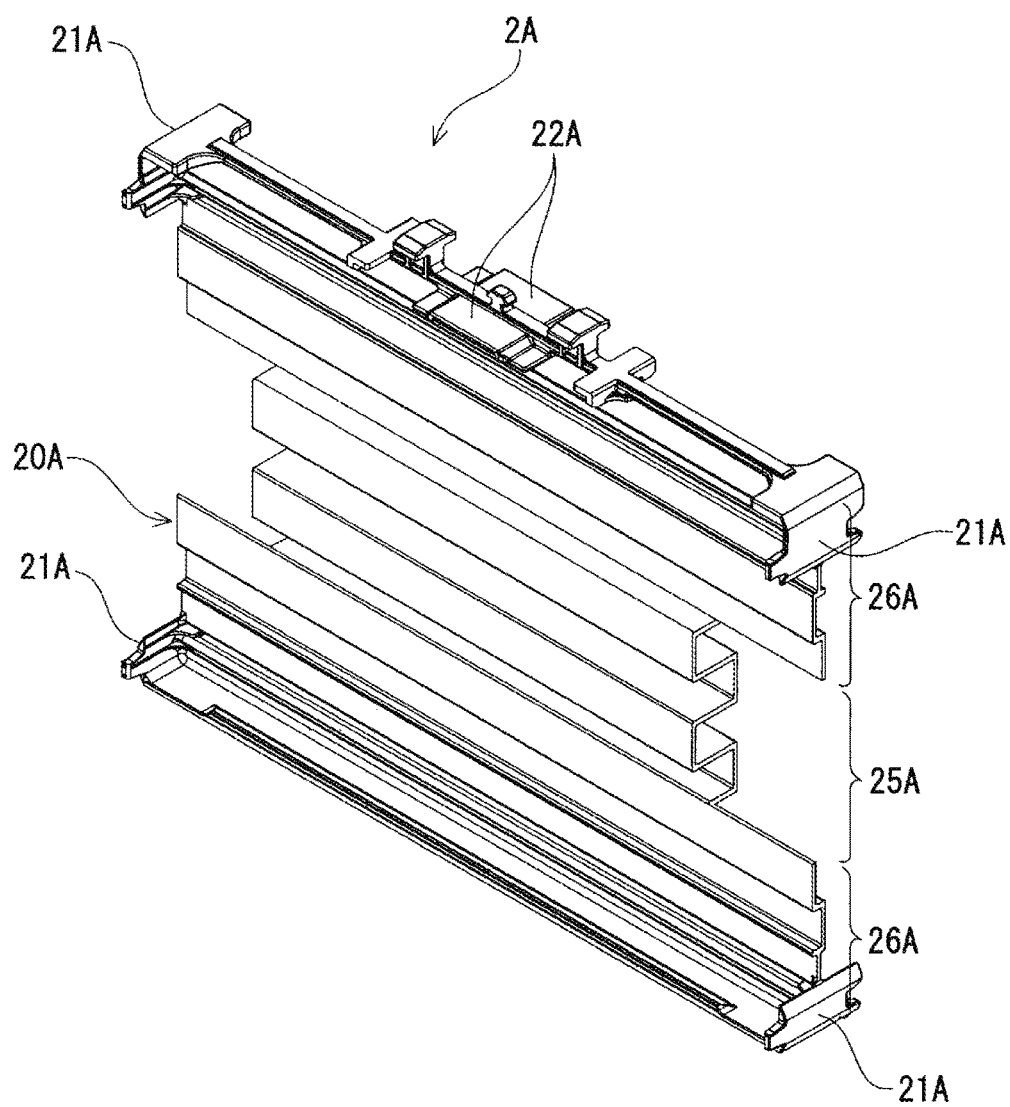
FIG. 13 is a perspective view of the inner spacer according to another embodiment.
Figure 13:
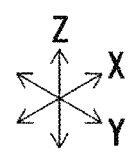
Figure 14:
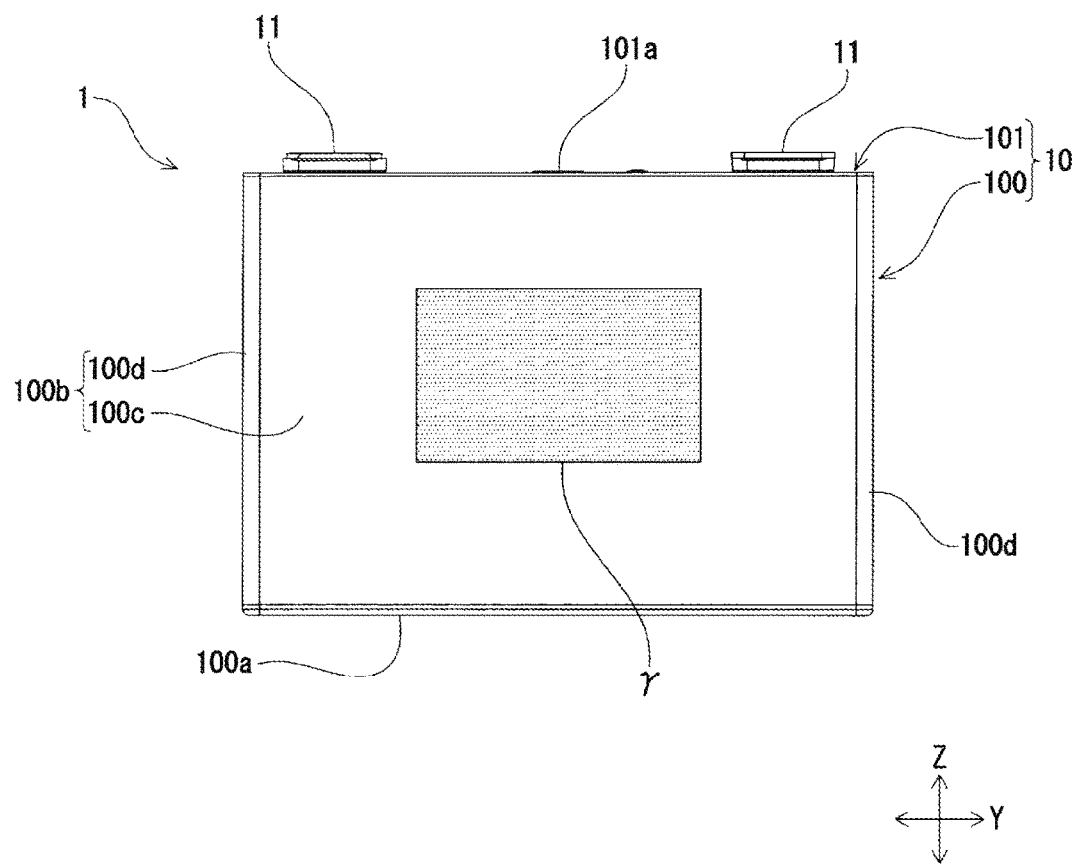
FIG. 14 is a view showing a region where a large pressing force is applied by the inner spacer.

In the above-mentioned embodiment, a width in the Y axis direction of the other portions 26A of the inner spacer 2A is also set smaller than a width in the Y axis direction of the energy storage device 1 arranged adjacently to the inner spacer 2A. However, the configuration of the inner spacer 2A is not limited to such a configuration. For example, as shown in FIG. 13, in the base 20A of the inner spacer 2A, only a width in the Y axis direction of the center portion 25A of the inner spacer 2A may be set smaller than a width in the Y axis direction of the case 10 (energy storage device 1). Also with such a configuration, the inner spacer 2A can press a portion γ of the first wall 100c shown in FIG. 14 which avoids hard portions (areas in the vicinity of portions joined to the second walls 100d and an area in the vicinity of a portion joined to the closing portion 100a) and oppositely faces the center portion of the electrode assembly 5 in the direction of the major axis (Z axis direction) with a force larger than a pressing force applied to portions around the portion y.

In the above-mentioned embodiment, a width in the Y axis direction of the projecting portions formed on the center portion 25A, 25B of the spacer 2 (in the example of the above-mentioned embodiment, a width (size) in the Y axis direction of the center portion 25A of the inner spacer 2A at the contact portions with the energy storage device 1, and a width (size) in the Y axis direction of the center portion 25B of the outer spacer 2B at the contact portions with the energy storage device 1 (distal ends of the inner contact portions 201B having a rib shape)) are equal to or slightly larger than a width in the Y axis direction of the active material layers of the electrode assembly 5 of the energy storage device 1. However, the configuration of the projecting portions is not limited to such a configuration. The width in the Y axis direction of the projecting portions may be set smaller than the width in the Y axis direction of the active material layers. With such a configuration, a contact area between the case 10 and the center portion 25A of the spacer 2A is decreased and hence, a value of pressing force (reaction force) per unit area applied to the case 10 from the spacer 2A is increased. Accordingly, a reaction force can be continuously applied to the center portion of the electrode assembly 5 in the Z axis direction more effectively when the electrode assembly 5 expands.

What is claimed is:

1. An energy storage apparatus, comprising:
an energy storage device including a flat electrode assembly in which electrodes are layered and a prismatic case in which the electrode assembly is housed; and
a spacer arranged adjacently to the energy storage device in a first direction,
wherein the spacer is formed such that a thickness of the spacer in the first direction of a center portion of the spacer in a second direction, which is a direction orthogonal to the first direction and is a direction parallel to a surface of the spacer that faces the energy storage device, is set larger than the thickness of the spacer in the first direction of other portions of the spacer arranged adjacently to the center portion of the spacer in the second direction, and a width of the center portion of the spacer in a third direction orthogonal to the first and second directions at a contact portion of the spacer with the energy storage device is set smaller than a width of the case in the third direction,
wherein the electrode assembly includes a wound electrode assembly with a winding center around which the electrodes are wound, and
wherein the winding center of the electrode assembly extends in the third direction.

2. The energy storage apparatus according to claim 1, wherein the electrodes which form the electrode assembly include an active material layer, and
wherein a width in the third direction of the center portion of the spacer at the contact portion is set equal to or larger than a width in the third direction of the active material layer of the electrode.

3. The energy storage apparatus according to claim 1, wherein the electrodes which form the electrode assembly include an active material layer, and
wherein the width in the third direction of the center portion of the spacer at the contact portion is set smaller than a width in the third direction of the active material layer of the electrode.

4. The energy storage apparatus according to claim 1, wherein the spacer includes a base arranged adjacently to the energy storage device and extending along the energy storage device,
wherein the width in the third direction of the center portion of the base is set smaller than the width in the third direction of the case,
wherein a shape of the base in a cross section including the first direction and the second direction is a rectangular corrugated shape, and
wherein an amplitude in the first direction of the center portion of the base is set larger than an amplitude in the first direction of other portions of the base arranged adjacently to the center portion of the base in the second direction.

5. The energy storage apparatus according to claim 1, wherein the spacer includes a base arranged adjacently to the energy storage device and extending along the energy storage device, and a plurality of projecting portions extending from the base toward the energy storage device arranged adjacently to the base, the projecting portions being arranged at intervals in the second direction,
wherein the plurality of projecting portions are brought into contact with portions of the case excluding both end portions of the case in the third direction, and
wherein an extending amount of the projecting portions formed on the center portion of the base is set larger than an extending amount of the projecting portions formed on other portions of the base arranged adjacently to the center portion of the base in the second direction.

6. The energy storage apparatus according to claim 5, wherein the plurality of projecting portions include ribs extending in the first direction and in the third direction.

7. The energy storage apparatus according to claim 1, wherein the thickness of the spacer in the first direction increases toward the center portion, which is located at a middle of the spacer in the second direction.

8. The energy storage apparatus according to claim 1, wherein, in the second direction, the thickness of the spacer gradually increases from a bottom of the spacer to a middle of the spacer, which is located in the center portion of the spacer.

9. The energy storage apparatus according to claim 1, wherein, throughout an entirety of the spacer, in the third direction, from an outer edge of the spacer to another outer edge of the spacer, the thickness of the spacer in the first direction remains constant.

10. The energy storage apparatus according to claim 1, wherein, the spacer is configured such that, a value of a pressing force per unit area applied to the prismatic case from the center portion, located in a middle of the spacer in the second direction, is more than a value of a pressing force per unit area applied to the prismatic case from the other portions, located around the middle portion of the spacer in the second direction.

11. The energy storage apparatus according to claim 1, further comprising:
another energy storage device including another flat electrode assembly in which other electrodes are layered and housed in the prismatic case,
wherein the spacer includes:
a plurality of first projecting portions protruding in the first direction toward the energy storage device, the first projecting portions being arranged at intervals in the second direction; and
a plurality of second projecting portions protruding in a direction opposite to the first direction toward said another energy storage device, the second projecting portions being arranged at intervals in the second direction such that the first projecting portions and the second projecting portions are arranged alternatively in the spacer in the second direction.

12. The energy storage apparatus according to claim 11, wherein one of the second projecting portions and one of the first projecting portions, which is located adjacent to the one of the second projecting portions, share a same connecting portion such that, in the second direction, edges of the first projecting portions and edges of the second projecting portions are continuously connected to each other.

13. An energy storage apparatus, comprising:
an energy storage device including a flat electrode assembly in which electrodes are layered and a prismatic case in which the electrode assembly is housed; and
a spacer arranged adjacently to the energy storage device in a first direction,
wherein the spacer is formed such that a thickness of the spacer in the first direction of a center portion of the spacer in a second direction, which is a direction orthogonal to the first direction and is a direction parallel to a surface of the spacer that faces the energy storage device, is set larger than the thickness of the spacer in the first direction of other portions of the spacer arranged adjacently to the center portion of the spacer in the second direction, wherein the electrode assembly includes a wound electrode assembly with a winding center around which the electrodes are wound, and wherein the winding center of the electrode assembly extends in a third direction orthogonal to the first and second directions.

14. The energy storage apparatus according to claim 13, wherein a width of the center portion of the spacer in the third direction orthogonal to the first and second directions at a contact portion of the spacer with the energy storage device is set smaller than a width of the case in the third direction.

15. The energy storage apparatus according to claim 13, wherein, in the second direction, the thickness of the spacer gradually increases from a bottom of the spacer to a middle of the spacer, which is located in the center portion of the spacer.

16. A method of manufacturing an energy storage apparatus, the method comprising:

housing, in a case, an energy storage device including an electrode assembly in which electrodes are layered;

forming a spacer such that a thickness of the spacer in a first direction in a center portion of the spacer is set larger than the thickness of the spacer in the first direction in other portions of the spacer arranged adjacently to the center portion of the spacer in a second direction, which is a direction orthogonal to the first direction; and placing the spacer adjacently to the energy storage device such that a surface of the spacer faces the energy storage device in the first direction, wherein the electrode assembly includes a wound electrode assembly with a winding center around which the electrodes are wound, and wherein the winding center of the electrode assembly extends in a third direction orthogonal to the first and second directions.

17. The method of manufacturing the energy storage apparatus according to claim 16, wherein, in the second direction, the thickness of the spacer gradually increases from a bottom of the spacer to a middle of the spacer, which is located in the center portion of the spacer.

18. The method of manufacturing the energy storage apparatus according to claim 16, wherein the placing the spacer includes applying a pressing force per unit area to the case from the center portion, located in a middle of the spacer in the second direction, more than a pressing force per unit area to the case from the other portions, located around the middle portion of the spacer in the second direction.

* * * * *